United States Patent Office 2,809,984
Patented Oct. 15, 1957

2,809,984

CYANOETHYLATED ANILIDES AND PHENYLENE BIS ACID AMIDES

Saul R. Buc, Easton, Pa., assignor to General Aniline & Film Corporation, New York, N. Y., a corporation of Delaware No Drawing. Application April 10, 1956, Serial No. 577,198

12 Claims. (Cl. 260—465)

This invention relates to cyanoethylated anilides and phenylene bis acid amides commercially useful as new dye intermediates and as stabilizers for sulfuric acid esters of vat dyestuffs.

The cyanoethylated anilides and phenylene bis acid amides of the present invention are characterized by the following general formulae:

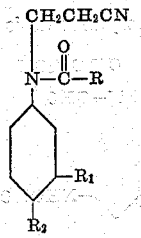

and

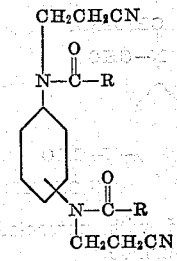

wherein R represents either hydrogen or lower alkyl, e. g., methyl, ethyl, propyl or butyl groups, $R_1$ represents either hydrogen, amino or nitro group, $R_2$ represents either hydrogen or amino, and wherein one but not both $R_1$ and $R_2$ groups represent hydrogen.

The compounds characterized by the foregoing general formulae are readily prepared by reacting 1 mole of an amino or nitro substituted anilide with 1 mole of acrylonitrile or by reacting 1 mole of either m- or p-phenylene bis acid amide with 2 moles of acrylonitrile in the presence of an inert solvent-diluent such as dioxane and in the presence of an alkaline condensing agent such as trimethyl benzyl ammonium hydroxide. The amount of the latter may range from 5 to 50 parts per 100 parts of acrylonitrile. The amount of dioxane is immaterial so long as a sufficient amount is employed to permit stirring of the reaction mixture.

As examples of anilides which are condensed with 1 mole of acrylonitrile, the following are illustrative:

3-nitro formanilide
3-amino formanilide
4-amino formanilide
3-nitroacetanilide
3-aminoacetanilide
4-aminoacetanilide
3-nitro propionanilide
3-amino propionanilide
4-amino propionanilide
3-nitro butyranilide
3-amino butyranilide
4-amino butyranilide As examples of phenylene bis acid amides which are reacted with 2 moles of acrylonitrile, the following may be employed:

m- or p-Phenylene bis-formamide
m- or p-Phenylene bis-acetamide
m- or p-Phenylene bis-propionamide
m- or p-Phenylene bis-butyramide The cyanoethylation of the subject group of compounds is unpredictable and surprising, since we were unable to cyanoethylate p-nitroacetanilide although one could cyanoethylate the meta-nitro isomer.

Further details regarding the process will become clearly manifest from the following working examples:

*Example I*

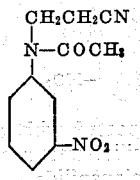

In a flask equipped with a reflux condenser 90 grams of 3-nitro acetanilide, 5.0 ml. of trimethyl benzyl ammonium hydroxide and 150 ml. of acrylonitrile were mixed, and the mixture refluxed for a period of 16 hours. Thereafter, the excess acrylonitrile was distilled, the remaining residue was poured into water where it slowly crystallized. The crystals were filtered, washed with water and dried, yielding 106 grams, or 91% of theory of a product having a melting point of 75–79° C. A sample of crystallized petroleum ether melted at 81–82.5° C.

The product may be reduced to form the product of Example II.

An attempt to cyanoethylate 4-nitro acetanilide under identical conditions was unsuccessful. The starting materials were recovered unchanged.

*Example II*

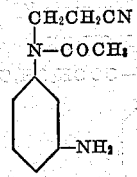

In a flask equipped with a stirrer there were charged 60 grams of 3-amino acetanilide, 100 ml. of dioxane, and 1.5 ml. of trimethyl benzyl ammonium hydroxide. To the charged mixture was added dropwise with stirrer 100 ml. of acrylonitrile. The temperature rose spontaneously to 35° C. for 2½ hours and then allowed to drop. The mixture was allowed to stand over night and the acrylonitrile and dioxane distilled in vacuum. The residue weighed 76 grams or 81.2% of theory, and is an oil which crystallized on long standing to an oily crystalline mass.

Attempts to carry out the reaction without dioxane led to an uncontrollably violent reaction.

*Example III*

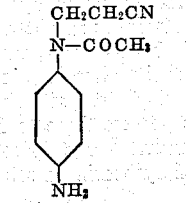

In a flask equipped with a reflux condenser there were charged 150 grams of 4-amino acetanilide, 200 ml. of acrylonitrile, and 5 ml. of trimethyl benzyl ammonium hydroxide. There was no spontaneous heat evolution, and accordingly, the mixture was refluxed for a period of 24 hours. The excess acrylonitrile was removed by distillation in vacuum. The residue weighed 268 grams. The theoretical yield is 203 grams. The excess weight is most likely polymerized acrylonitrile. The product was separated from the polymer by solution in a slight excess of cold dilute hydrochloric acid, decanting from the tarry polymer and charcoaling and filtering the aqueous solution and the product precipitated as an oil by the addition of an aqueous solution of potassium carbonate. It was then extracted from the water with chloroform and dried over potassium carbonate and the chloroform distilled. The weight of the final oily product was 194 grams which could not be made to crystallize.

*Example IV*

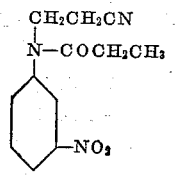

Example I was repeated with the exception that 90 grams of 3-nitroacetanilide were replaced by an equivalent amount of 3-nitro propionanilide.

The product may be reduced as in Example I to form the corresponding amino derivative.

*Example V*

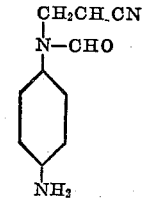

Example II was repeated with the exception that 60 grams of 3-aminoacetanilide were replaced by an equivalent amount of 4-amino formanilide.

*Example VI*

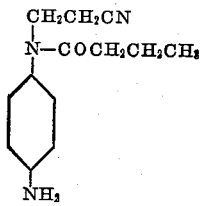

Example III was repeated with the exception that 150 grams of 4-aminoacetanilide were replaced by an equivalent amount of 4-amino butyranilide.

The nitro group of the products of Examples I and IV is readily converted by conventional means to an amino group. The resulting amino containing compound and those of Examples II, III, V and VI are useful as intermediates in the preparation of anthraquinone dyes possessing excellent gas and light fastness when dyed on cellulose ester fibers. For example, they may be condensed with 4,5-dinitro chrysazine or 4,8-dinitroanthrarufin to yield dyestuffs which dye acetate rayon blue shades possessing outstanding light and gas fastness. It is the presence of the m- or p-amino cyanoethylated anilide group in the nitro anthraquinone dye which imparts constant blue shades of superior fastness. Moreover, such dyestuffs possess three to four times as much affinity, i. e. substantivity to cellulose acetate than any of the dyes prepared by heating a mixture of leuco-1,4,5-dihydroxy anthraquinone with an aryl amine such as p-aminoacetanilide.

*Example VII*

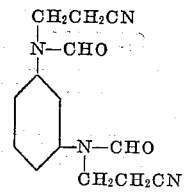

In a flask equipped with a stirrer there were charged 164 grams of m-phenylene bis-formamide, 200 ml. of dioxane and 5 ml. of trimethyl benzyl ammonium hydroxide. To the charged mixture there was added dropwise 200 ml. of acrylonitrile. The temperature rose as the amide dissolved as the reaction proceeded. The temperature was not allowed to exceed 50° C. After the end of the addition of the acrylonitrile, the reaction mixture was allowed to stand over night. The homogeneous mixture on scratching and cooling gave an essential quantitative yield of crystallized product. It was filtered, washed with cold dioxane and dried. It has a melting point of 114–117° C.

When insufficient acrylonitrile is used, a mixture of

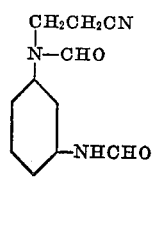

and

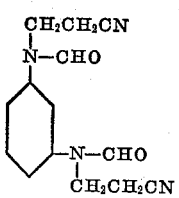

is obtained admixed with unreacted starting product, m-phenylene bis-formamide.

*Example VIII*

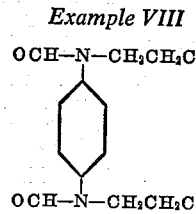

Example VII was repeated with the exception that 164 grams of m-phenylene bis-formamide was replaced by the same amount of p-phenylene bis-formamide, and the volume of dioxane increased by 100 ml. The yield of the final product was 243 grams which is equivalent to 87% of theory.

*Example IX*

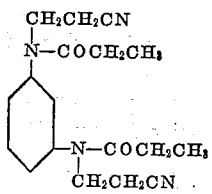

Example VII was repeated with the exception that 164 grams of m-phenylene bis-formamide were replaced by an equivalent amount of m-phenylene bis-propionamide.

Example X

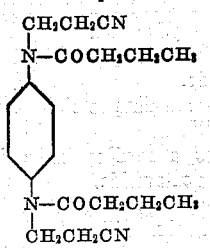

Example VII was again repeated with the exception that the 164 grams of p-phenylene bis-formamide were replaced by an equivalent amount of p-phenylene bis-butyramide.

The products of Examples VII to X inclusive are useful in solubilizing alkali metal salts of sulfuric acid esters of leuco vat dyes in aqueous printing paste formulations. This solubilizing property is extremely valuable since one of the major problems in the dye industry is the production of uniform, level, non-sticky dye product. To effectuate these desirable properties, it is necessary to have the dyestuff in as fine a state of subdivision as possible, and preferably in solution.

The products of Examples VII to X inclusive enhance the solubility of the alkali metal salts of sulfuric acid ester of leuco vat dyes in aqueous medium thereby leading to level, nuon-sticking dyeings. In addition they have the property in common of enhancing solubilization of dissociable ionic compounds in polar solvents.

The free amino products of Examples II, III, V and VI may be used in the preparation of methine dyes, diazos, azo dyes, and the like.

I claim:

1. A cyanoethylated compound selected from the class consisting of those corresponding to the following formulae:

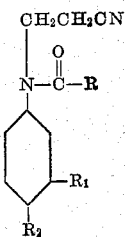

and

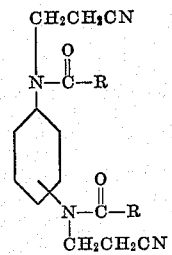

wherein R represents a member selected from the class consisting of hydrogen and lower alkyl, $R_1$ represents a member selected from the class consisting of hydrogen, amino and nitro, $R_2$ represents a member selected from the class consisting of hydrogen and amino, and wherein only one of the $R_1$ and $R_2$ groups represents hydrogen.

2. A cyanoethylated compound having the formula:

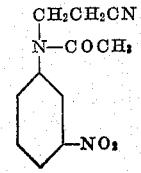

3. A cyanoethylated compound having the formula:

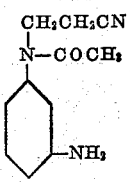

4. A cyanoethylated compound having the formula:

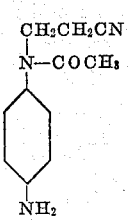

5. A cyanoethylated compound having the formula:

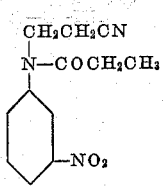

6. A cyanoethylated compound having the formula:

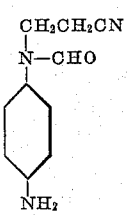

7. The process of preparing cyanoethylated compounds selected from the class consisting of those corresponding to the following formulae:

(A) 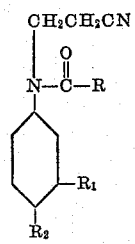

and (B) 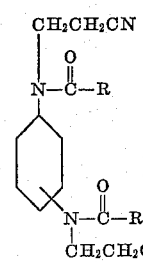

wherein R represents a member selected from the class consisting of hydrogen and lower alkyl, $R_1$ represents a member selected from the class consisting of hydrogen, amino and nitro, $R_2$ represents a member selected from the class consisting of hydrogen and amino, and wherein only one of the $R_1$ and $R_2$ groups represents hydrogen, which comprises reacting in the case of compounds A one mole of acrylonitrile with one mole of an anilide having the following formula:

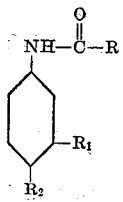

wherein R, R₁ and R₂ have the same values as above, and in the case of compounds B 2 moles of acrylonitrile with one mole of a phenylene bis acid amide having the following formula:

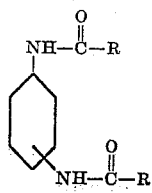

wherein R has the same value as above, in the presence of an inert solvent diluent and in the presence of trimethyl benzyl ammonium hydroxide.

8. The process according to claim 7 wherein the anilide is 3-nitro acetanilide.

9. The process according to claim 7 wherein the anilide is 3-amino acetanilide.

10. The process according to claim 7 wherein the anilide is 4-amino acetanilide.

11. The process according to claim 7 wherein the anilide is 3-nitro propionanilide.

12. The process according to claim 7 wherein the anilide is 4-amino formanilide.

References Cited in the file of this patent

UNITED STATES PATENTS

| | | |
|---|---|---|
| 2,538,024 | McKinney et al. | Jan. 16, 1951 |
| 2,722,536 | Hoefle et al. | Nov. 1, 1955 |

FOREIGN PATENTS

| | | |
|---|---|---|
| 976,959 | France | Nov. 8, 1950 |